April 28, 1964      G. B. MYAIDA ETAL      3,130,706
BIRDHOUSE

Filed Oct. 8, 1962      2 Sheets-Sheet 1

INVENTORS
GRACE B. MYAIDA
SHOGO J. MYAIDA
BY Frank A. Bower
ATTORNEY

April 28, 1964   G. B. MYAIDA ETAL   3,130,706
BIRDHOUSE
Filed Oct. 8, 1962   2 Sheets-Sheet 2
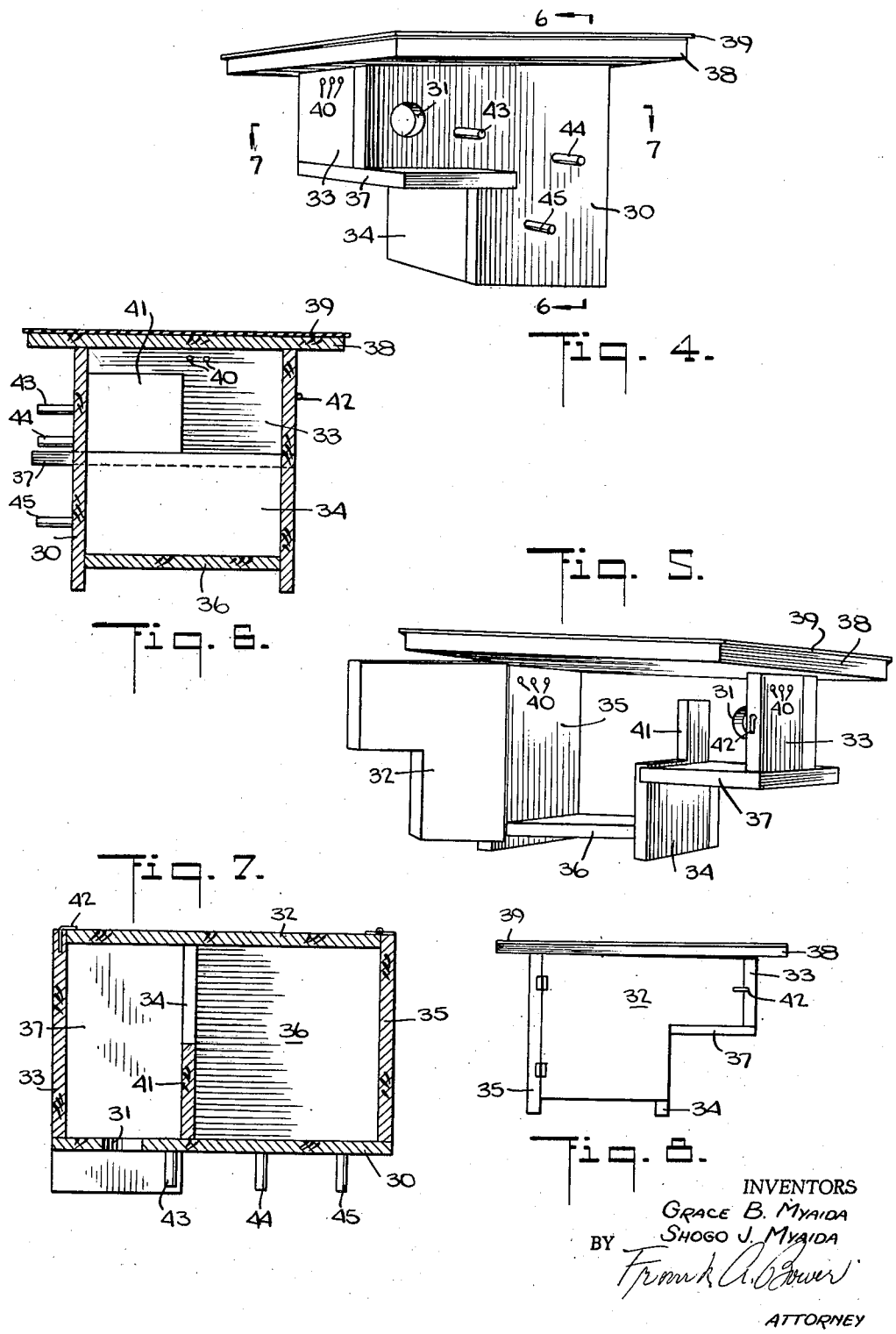
INVENTORS
GRACE B. MYAIDA
BY  SHOGO J. MYAIDA
Frank A. Bower
ATTORNEY Patented Apr. 28, 1964

3,130,706
BIRDHOUSE
Grace B. Myaida and Shogo J. Myaida, both of 21 Searingtown Road, Albertson, N.Y.
Filed Oct. 8, 1962, Ser. No. 229,017
10 Claims. (Cl. 119—23)

This invention pertains to a wooden birdhouse of simple, functional design for families of birds, with special features for protection of baby birds.

It relates specifically to the housing of nesting bird families and particularly a birdhouse structure which is both attractive to the parent birds and serviceable to them and their nestlings to provide a secure, dry place for the birds to nest and hatch their young out of reach of larger birds, cats and the like.

The interior is separated into two compartments, a small entrance area and a larger nesting area. The entrance hole positioned as desired in front, leads to an entrance area, not to the nesting area. Right or left angle turn from the entrance area into the nesting area assures eggs and occupants the full protection from molestation by larger birds, cats' paws and from driving rain.

While convenient to the parent birds, it is also accommodating to nestlings on substantially the same level with less likelihood of accident. As the nestlings grow they may easily advance from the nesting area to the entrance area and to an entrance hole to be fed by the parents. Young birds become gradually familiar with the outside world, thus preventing immature nestlings from falling out. However, should sudden danger threaten, they can instantly retreat to the safety and security of the nesting area.

In the drawings:

FIGS. 4, 5, 6 and 7 show the front view, rear view, vertical section and horizontal section, respectively, of a split-level form of panel house with adaptations for wren, chickadee or others; and FIG. 8 shows a rear view of the split-level model drawn to a reduced scale and with door closed.

Figure 1:
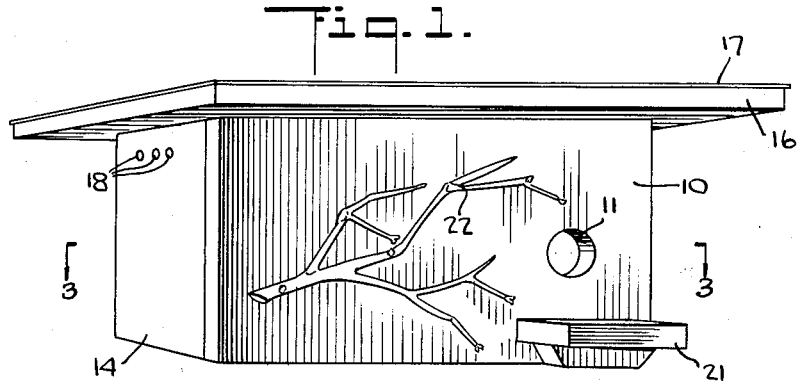
FIGS. 1, 2 and 3 show the front view, rear view and horizontal section, respectively, of a form of housing of simple panel structure designed, for instance, for bluebird, sparrow and others, with an advantage of allowing the birds to move generally in a horizontal rather than a vertical direction.
Figure 2:
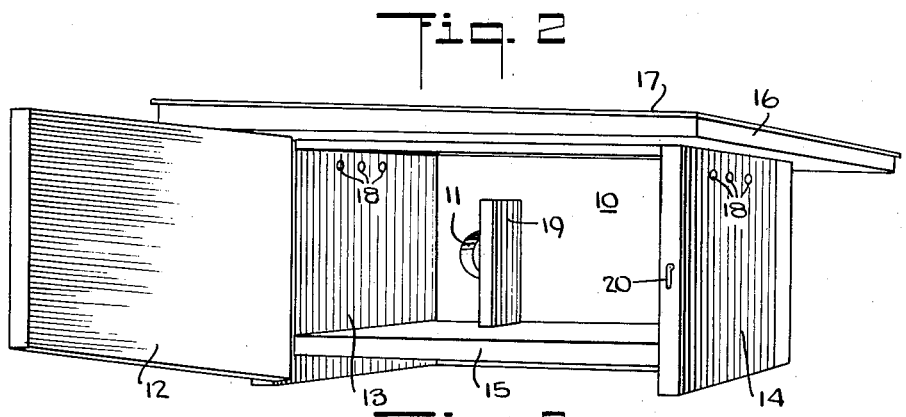
Figure 3:
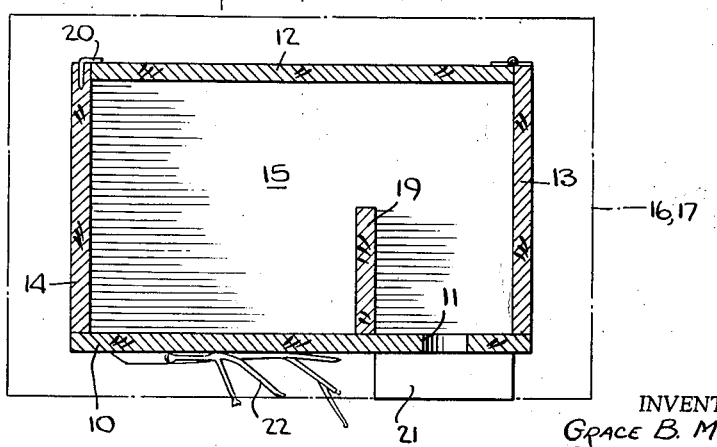

Referring to the embodiment illustrated in FIGS. 1, 2 and 3, the front panel 10 with its orifice 11 faces the back door 12 closing the rear between side panels 13 and 14 spanned by floor piece 15 and closed over by roofing panel 16 with its asphalt shingling 17.

Ventilation is added by holes 18 placed in desired manner through the paneling at upper points under the overhang of the roof 16, 17. Entrance orifice 11 provides for the access to the interior. The half partition 19 leaves the upper space horizontally free for circulation above the nest, and at the same time acts as a deterrent panel between the orifice and the nesting area to prevent molestation by larger birds, cats' paws and other undesirable elements.

This birdhouse structure of FIGS. 1, 2 and 3 completes the availability of the areas and parts for the continued use of the birds' occupation and the rearing of the nestling family.

The parts are readily secured together in desired manner with back door 12 swinging readily to be held closed or released by the latchet action of L screw hook 20. The landing step 21 and ornamental perching twig 22 (or perching pegs) may be provided as desired. The house itself is adaptable to various mountings as determined by the surrounding structures and growth.

Referring to the embodiment illustrated in FIGS. 4, 5, 6, 7 and 8, the front panel 30 with its orifice 31 faces the back door 32 closing the rear between side panels 33, 34 and 35 spanned by floor pieces 36 and 37 and closed over by roofing panel 38 with its asphalt shingling 39.

Floor piece 37 extends forward beyond front panel 30 to form a small landing platform.

Ventilation is added by holes 40 placed in desired manner through the paneling at upper points under the overhang of the roof 38, 39. Entrance orifice 31 provides for the access to the interior. The half partition 41 leaves the upper space horizontally free for circulation above the nest, and at the same time acts as a deterrent panel between the orifice and the nesting area to prevent molestation by larger birds, cats' paws and other undesirable elements.

This birdhouse structure of FIGS. 4, 5, 6, 7 and 8 completes the availability of the areas and parts for the continued use of the birds' occupation and the rearing of nestling families.

The parts are readily secured together in desired manner with back door 32 swinging readily to be closed or released by the latchet action of L screw hook 42. Perching pegs 43, 44 and 45 (or ornamental perching twig 22) may be provided as desired. The house itself is adaptable to various mountings as determined by the surrounding structures and growth.

The preferred types of single pivoted and hook fastened back doors as shown may be in this entrance-nesting combination have substituted a spring closed door or separate doors for the entrance and nesting areas.

Instead of depending on L screw hook 20, the pivoted back door 12 may be oppositely mounted as an inset hinged along the vertical rear edge of panel 14 and held closed by a leaf or coil spring, the closing force of which is adjustable to the type or size of bird and permitting a parent bird in the entrance space to use the longer leverage and press the door open from within and find its way out. There is no way for the birds or intruders to open the resiliently held back door from the outside.

Where there are a plurality of pivot mounted rear doors separate from the entrance and nesting areas, corresponding hook or spring closing may be provided as desired.

In the separation of the structural parts as permitted here, they are rendered individually adaptable to a wide variety of combinations suited to the particular demands of different bird types and sizes and the preferred appearance in the local setting. There will always be the appeal to the nesting birds as emphasized by the wide but safe expansion of the entrance into the nesting facilities and the continuous service accorded at all times and weathers—all within the combined features as set forth in the following claims.

We claim:

1. A birdhouse structure adapted for nesting families of birds and comprising an enclosed protective space between front and rear walls joined by side walls and divided by a partial partition extending forward between said side walls to form an inner nestling area and an entrance area in full depth in direction of entrance and with an entrance opening and a separate sidewise horizontal passage for parent birds and nestlings to said inner nestling area and combining with this a relatively deterring aspect of said entrance area for inaccessibility of intruder to said inner nestling area.

2. A birdhouse structure adapted for nesting families of birds as set forth in claim 1 in which the enclosed protective space has a rear door opening simultaneously to both the entrance area and nestling area.

3. A birdhouse structure adapted for nesting families of birds as set forth in claim 1 in which there is a half partition between the entrance area and nestling area leaving free communication for interchange of air between said areas at the top.

4. A birdhouse structure adapted for nesting families of birds as set forth in claim 1 in which the entrance area extends all the way from front to back of the enclosed protective space.

5. A birdhouse structure adapted for nesting families of birds as set forth in claim 1 in which the nestling area extends from front to back of said enclosed protective space.

6. A birdhouse structure adapted for nesting families of birds as set forth in claim 1 in which the nestling area extends from front to back of said enclosed protective space alongside of said entrance area.

7. A birdhouse structure adapted for nesting families of birds as set forth in claim 1 in which there is horizontal flooring extending under both said entrance area and said nestling area.

8. A birdhouse structure adapted for nesting families of birds as set forth in claim 1 in which there is horizontal flooring extending under both said entrance area and said nestling area at the same level.

9. A birdhouse structure adapted for nesting families of birds as set forth in claim 1 in which there is horizontal flooring extending under both said entrance area and said nestling area at different levels.

10. A birdhouse structure adapted for nesting families of birds as set forth in claim 1 in which there is flooring extending under said nestling area at a level below said entrance area.

References Cited in the file of this patent

UNITED STATES PATENTS

| | | |
|---|---|---|
| 2,808,027 | Inghram | Oct. 1, 1957 |
| 2,932,279 | Giles | Apr. 12, 1960 |

FOREIGN PATENTS

| | | |
|---|---|---|
| 697,238 | Germany | Oct. 9, 1940 |